(12) United States Patent
Makowski et al.

(10) Patent No.: US 10,866,908 B2
(45) Date of Patent: Dec. 15, 2020

(54) SYSTEM AND METHOD FOR PROBABILISTIC DEFENSE AGAINST REMOTE EXPLOITATION OF MEMORY

(71) Applicant: Narf Industries, LLC, San Francisco, CA (US)

(72) Inventors: Paul E. Makowski, San Diego, CA (US); Benjamin L. Schmidt, San Diego, CA (US); Maxwell J. Koo, Tampa, FL (US)

(73) Assignee: NARF INDUSTRIES, LLC, San Francisco, CA (US)

( * ) Notice: Subject to any disclaimer, the term of this patent is extended or adjusted under 35 U.S.C. 154(b) by 0 days.

(21) Appl. No.: 15/600,315

(22) Filed: May 19, 2017

(65) Prior Publication Data
US 2017/0337139 A1  Nov. 23, 2017

Related U.S. Application Data

(60) Provisional application No. 62/339,049, filed on May 19, 2016.

(51) Int. Cl.
*G06F 12/14* (2006.01)
*G11C 7/24* (2006.01)
*G06F 1/24* (2006.01)

(52) U.S. Cl.
CPC .......... *G06F 12/14* (2013.01); *G06F 12/1416* (2013.01); *G06F 1/24* (2013.01); *G06F 12/1458* (2013.01); *G06F 12/1491* (2013.01); *G11C 7/24* (2013.01)

(58) Field of Classification Search
None
See application file for complete search history.

(56) References Cited

FOREIGN PATENT DOCUMENTS

WO    WO-2013174503 A1 * 11/2013 ............. G06F 21/53

OTHER PUBLICATIONS

Crane et al., Redactor: Practical Code Randomization Resilient to Memory Disclosure, 2015, IEEE, pp. 763-780 [18 pages].*
Crane et al., It's a TRaP: Table Randomization and Protection against Function-Reuse Attacks, Oct. 2015, ACM, 13 pages (Year: 2015).*

* cited by examiner

*Primary Examiner* — Gary W. Cygiel
(74) *Attorney, Agent, or Firm* — Kwan & Olynick LLP

(57) ABSTRACT

A system and method is provided for probabilistic defense against remote exploitation of memory. In certain embodiments, the system comprises one or more processors, read and execute (RX) portions of memory, read and write (RW) portions of memory, execute only (XOM) portions of memory, and one or more programs stored in the memory. The one or more programs include instructions for maintaining all pointers to RX memory instructions in XOM memory. In addition, the one or more programs include instructions for preventing all direct references to RX memory in RW memory by forcing pointers in RW memory to reference XOM memory first, which then references RX memory instructions.

18 Claims, 6 Drawing Sheets

SYSTEM AND METHOD FOR PROBABILISTIC DEFENSE AGAINST REMOTE EXPLOITATION OF MEMORY

CROSS-REFERENCE TO RELATED APPLICATIONS

This application claims priority under 35 U.S.C. § 119 to Provisional U.S. Patent Application No. 62/339,049 by Makowski et al., filed on May 19, 2016, titled "System and Method for Probabilistic Defense Against Remote Exploitation of Memory," which is incorporated by reference herein in its entirety and for all purposes.

TECHNICAL FIELD

The disclosed embodiments relate generally to computer networks and security systems.

BACKGROUND

Computer programs contain vulnerabilities. A common metric is the number of bugs over lines of code (LOC). The more complex the software, the more opportunity for vulnerabilities.

One of the most difficult open problems in computer security is the elimination of memory corruption vulnerabilities. Memory-unsafe languages such as C, C++, Obj-C and many others make no guarantees regarding safe usage of memory. This is an attractive property for some applications and a necessary one for others.

All operating system kernels (e.g. Linux, Windows, Darwin, others) are necessarily authored in memory-unsafe languages. Kernel developers must make use of potentially-unsafe logic in order to sufficiently interface with the underlying hardware. Fortunately, user space applications have more leeway in terms of programming language choice: seldom do they need to exercise low-level characteristics of the underlying hardware.

Nevertheless, many of today's user space applications are written in memory-unsafe languages. This is true of ubiquitous programs such as Microsoft Office, Adobe Reader, Google Chrome, Apple Safari, Mozilla Firefox and many others. Although these applications need not intimately interact with the underlying hardware, memory-unsafe languages are capable of producing faster code that incurs lower overhead (e.g. runs faster, consumes less battery). The balance has, for the most part, remained in favor of overhead concerns at the cost of memory safety.

In many situations, defenders are well-advised to assume that attackers have knowledge of memory corruption vulnerabilities in memory-unsafe applications that are heavily deployed across their enterprise. Rather than attempting to find and fix all vulnerabilities, defenders are increasingly turning to techniques that increase attacker cost, forcing a trickle down-effect from their defended network to a less-defended one. Efforts such as DEP, NX, WAX, ASLR, CFI, CPI and EMET have significantly raised the bar.

Unfortunately, skilled and motivated attackers surmount these exploit mitigations on a regular basis. Sometimes successful exploitation demands the use of multiple vulnerabilities, and almost always it increases development time for producing a stable exploit. In some cases, these mitigations even manage to close an avenue of exploitation or aim to render an entire class of vulnerabilities non-exploitable for code execution (but still exploitable for denial of service). Elimination of an avenue for exploitation is the best-case scenario and leaves much to be desired. Thus, there exists a need for improved defense that can defeat attackers that are able to surmount these exploit mitigations, e.g. defeat ASLR.

No current mitigation technique can guarantee memory safety. Some attempt to claim some subset, e.g. CFI, but to date have not been made sufficiently performant for real-world applications. As always, compromise must be achieved between security and performance. The mechanisms and techniques described herein enables a probabilistic defense against remote exploitation of memory corruption vulnerabilities that require an ASLR bypass.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, embodiments of the present disclosure provide a system, method, and computer readable medium for probabilistic defense against remote exploitation of memory. In certain embodiments, the system comprises one or more processors, read and execute (RX) portions of memory, read and write (RW) portions of memory, execute only (XOM) portions of memory, and one or more programs stored in the memory. The one or more programs include instructions for maintaining all pointers to RX memory instructions in XOM memory. In addition, the one or more programs include instructions for preventing all direct references to RX memory in RW memory by forcing pointers in RW memory to reference XOM memory first, which then references RX memory instructions.

BRIEF DESCRIPTION OF THE DRAWINGS

Like reference numerals refer to corresponding parts throughout the drawings.

DESCRIPTION OF EMBODIMENTS

Figure 1:
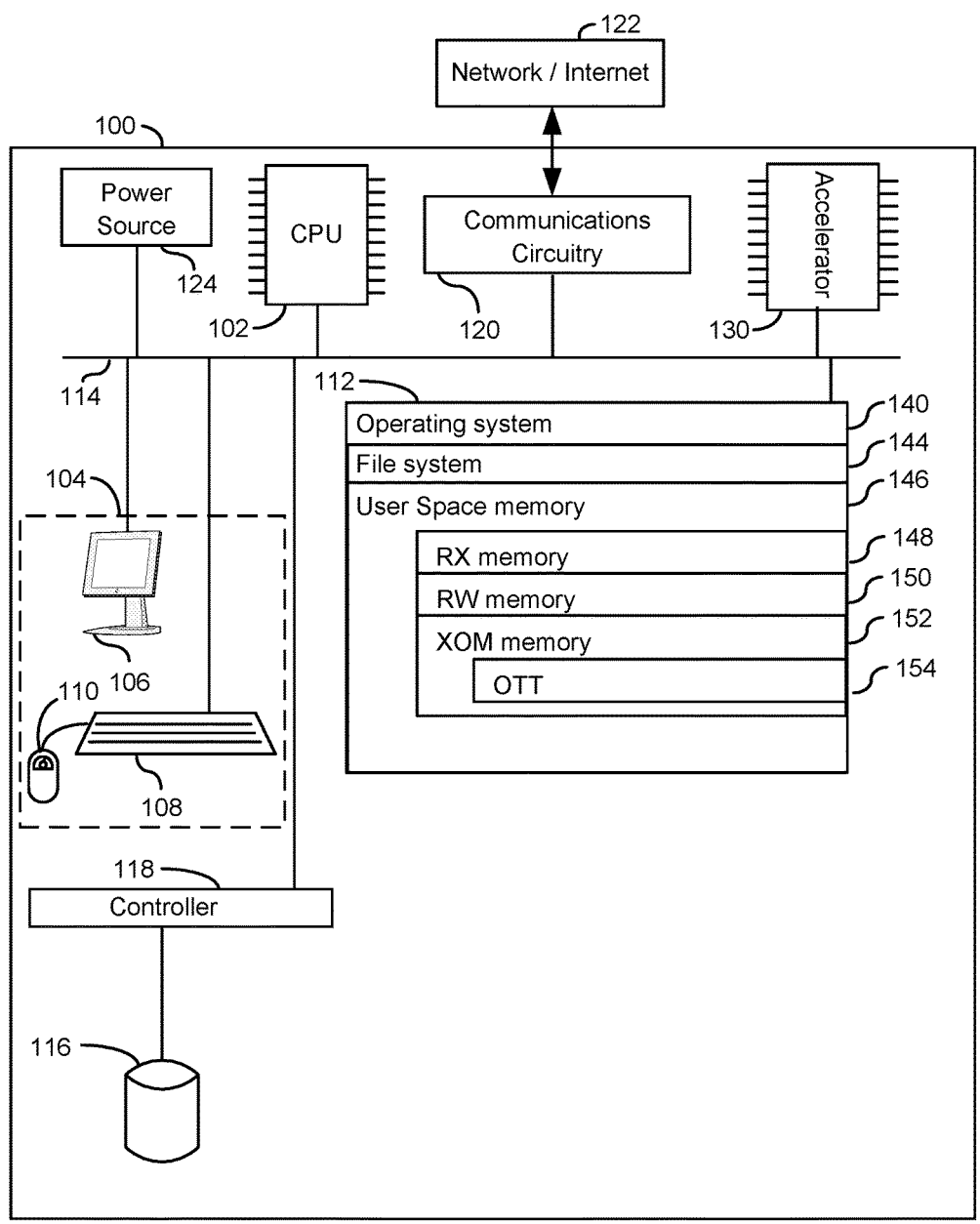
FIG. 1 is a block diagram illustrating an example of a computer system capable of implementing various processes described in the present disclosure.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

OVERVIEW

When faced with NX, an attacker who wishes to execute arbitrary code must reuse existing code in the target address space (e.g. via ROP). Reuse of existing code demands knowledge concerning this code's location in the target address space. ASLR purposefully removes this knowledge from the attacker, requiring attackers to leak code locations. Any advancement that makes it more difficult or impossible for the attacker to conduct such a leak substantially increases attacker cost and may close off exploitation avenues entirely. The systems and methods described here is one such advancement.

According to various embodiments, legitimate code can be written so that it never needs access to code pointers, but illegitimate use of code (e.g. during a memory corruption attack) must always require access to code pointers to defeat ASLR. Thus, the systems and methods provided herein prevent attackers from disclosing code pointers. In short, by moving all such code pointers into memory that cannot be read, attackers cannot attempt disclosure without setting off alarms and/or crashing the target process. In some embodiments, the process is not as simple as "just move all code pointers to non-Readable memory" because code must legitimately reference itself, e.g. to call functions in other code segments. Therefore, according to various embodiments, the techniques of the present disclosure leverage eXecute-Only Memory (XOM) to permit eXecution (X) access to code pointers but deny Read (R) or Write (W) access to the same.

DETAILED DESCRIPTION

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1

FIG. 1 is a block diagram illustrating an example of a computer system capable of implementing various processes described in the present disclosure. The system 100 typically includes a power source 124; one or more processing units (CPU's) 102 for executing modules, programs and/or instructions stored in memory 112 and thereby performing processing operations; one or more network or other communications circuitry or interfaces 120 for communicating with a network 122; controller 118; and one or more communication buses 114 for interconnecting these components. In some embodiments, network 122 can be the another communication bus, the Internet, an Ethernet, an Intranet, other wide area networks, local area networks, and metropolitan area networks. Communication buses 114 optionally include circuitry (sometimes called a chipset) that interconnects and controls communications between system components. System 100 optionally includes a user interface 104 comprising a display device 106, a keyboard 108, and a mouse 110. Memory 112 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 112 may optionally include one or more storage devices 116 remotely located from the CPU(s) 102. Memory 112, or alternately the non-volatile memory device(s) within memory 112, comprises a non-transitory computer readable storage medium. In some embodiments, memory 112, or the computer readable storage medium of memory 112 stores the following programs, modules and data structures, or a subset thereof:

- an operating system 140 that includes procedures for handling various basic system services and for performing hardware dependent tasks;
- a file system 144 for storing various program files; and
- user space memory 146 for executing applications.

User space memory 146 may include the following portions of memory, or a subset thereof:

- RX memory 148 for storing readable and executable segments of code;
- RW memory 150 for storing readable and writeable segments of code; and
- XOM memory 152 for storing execute only segments of code, XOM memory 152 further including OTT 154 for storing pointers to RX memory.

Any of the modules mentioned above may also include submodules. Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 112 may store a subset of the modules and data structures identified above. Furthermore, memory 112 may store additional modules and data structures not described above. In some embodiments, system 100 may even include an accelerator 130 to help carry out processing for any of its functions.

Although FIG. 1 shows one example of a computer system, FIG. 1 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers. The actual number of servers used to implement a system and how features are allocated among them will vary from one implementation to another, and may depend in part on the amount of data traffic that the system must handle during peak usage periods as well as during average usage periods.

FIG. 2

Figure 2:
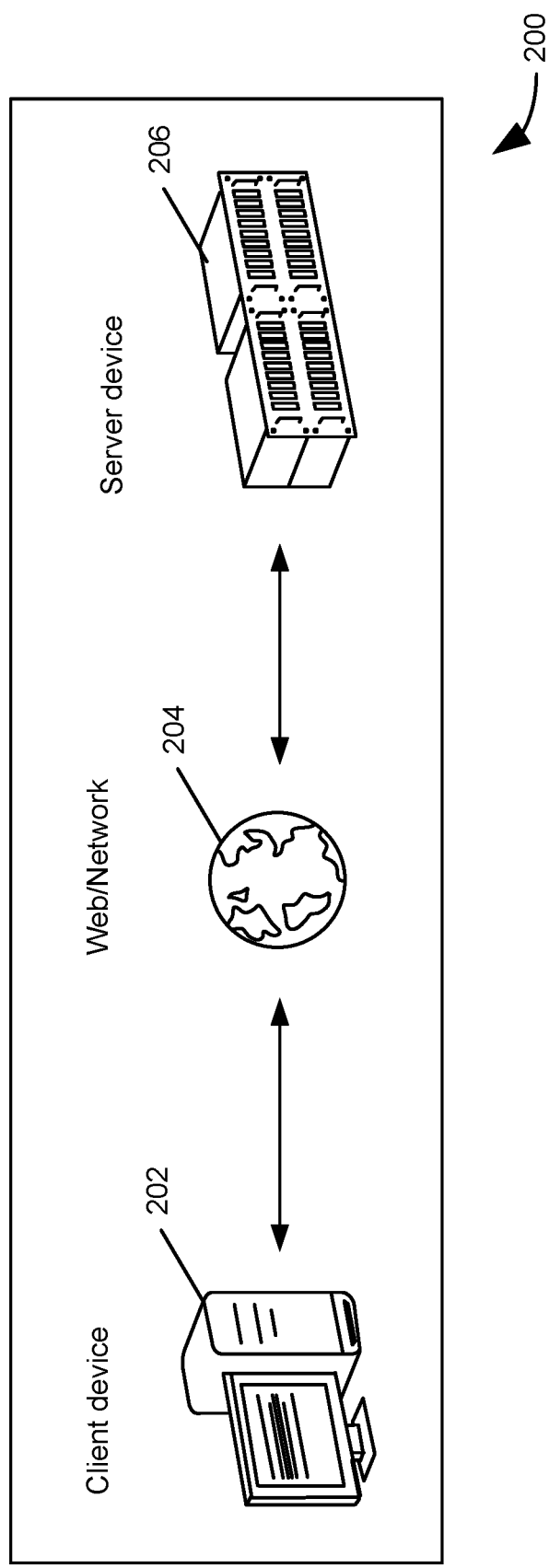
FIG. 2 illustrates a general overview of an example system for implementing various methods of the present disclosure.

FIG. 2 illustrates a general overview of an example system 200 for implementing various methods of the present disclosure. In particular, FIG. 2 describes a client device 202, e.g. a computer, configured with a web browser to interact with another a server device 206 via Internet or Web 204 containing modules required for performing the mechanisms and techniques described herein. In some embodiments, client device 202 is configured to run user applications that can be exploited by attackers over Internet 204. In such embodiments, client device 202 can also be configured with an OTT in order to probabilistically defend against attackers.

As with FIG. 1, FIG. 2 is intended more as functional description of the various features which may be present in a set of servers than as a structural schematic of the embodiments described herein. In practice, and as recognized by those of ordinary skill in the art, items shown separately could be combined and some items could be separated. For example, server device 206 could be implemented as a single server or as multiple servers. As another example, client device 202 could be implemented as a single client computer or as multiple client computers. The actual number of client computers and servers used to implement system 200 and how features are allocated among them will vary from one implementation to another, and may depend in part on the amount of data traffic that the system must handle during peak usage periods as well as during average usage periods.

FIG. 3

Figure 3:
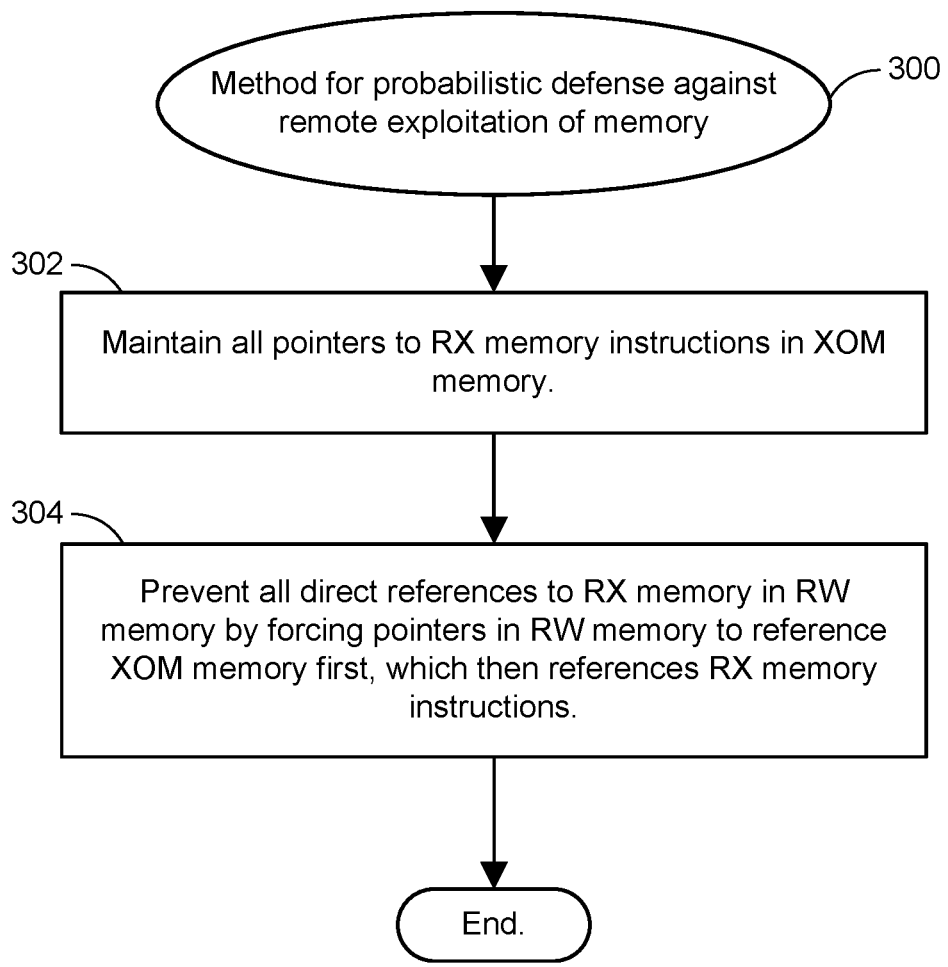
FIG. 3 illustrates a method for probabilistic defense against remote exploitation of memory, according to certain embodiments of the present disclosure.

FIG. 3 is a flowcharts representing method 300, according to certain embodiments of the present disclosure. Method 300 is governed by instructions stored in a computer readable storage medium and that are executed by one or more processors of one or more servers. Each of the operations shown in FIG. 3 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

FIG. 3 illustrates a method 300 for probabilistic defense against remote exploitation of memory, according to certain embodiments of the present disclosure. Method 300 begins with maintaining (302) all pointers to RX memory instructions in XOM memory. Next, the method includes preventing (304) all direct references to RX memory in RW memory by forcing pointers in RW memory to reference XOM memory first, which then references RX memory instructions.

In some embodiments, all pointers to RX memory instructions in XOM memory are maintained in an opaque trampoline table (OTT). In some embodiments, the OTT is a contiguous region of XOM memory. In some embodiments, the OTT comprises JMPs and CALLs. In some embodiments, ASLR is implemented on the system. In some embodiments, if an attacker can leak a pointer to a code segment, the attacker is still forced to guess because the attacker cannot find out through the leak where code segments exist in target address space. In some embodiments, an attacker is able to conduct arbitrary read and writes over the address space.

Figure 4A:
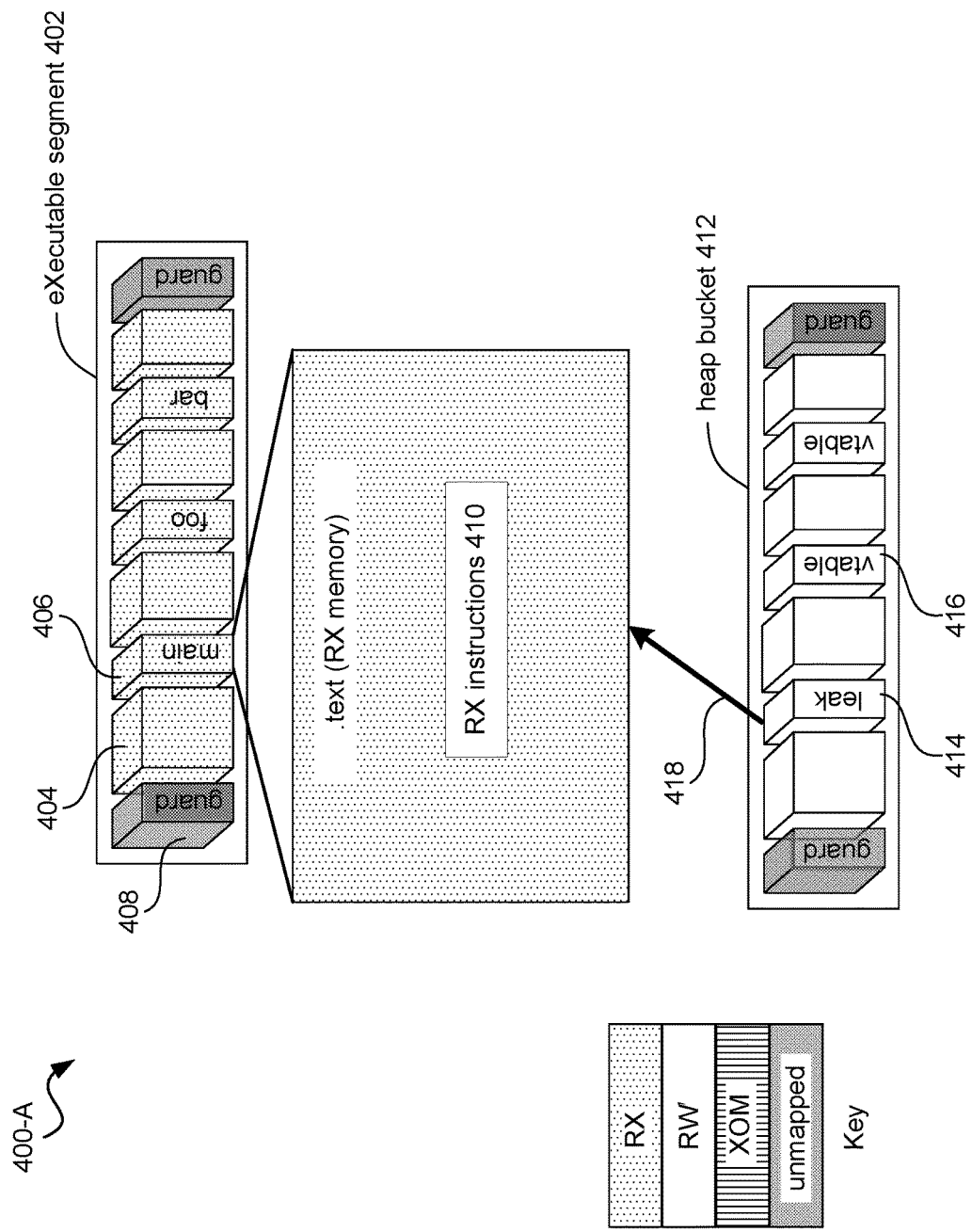
FIG. 4A illustrates an example memory design without implementing an opaque trampoline table (OTT), according to certain embodiments of the present disclosure.
Figure 4B:
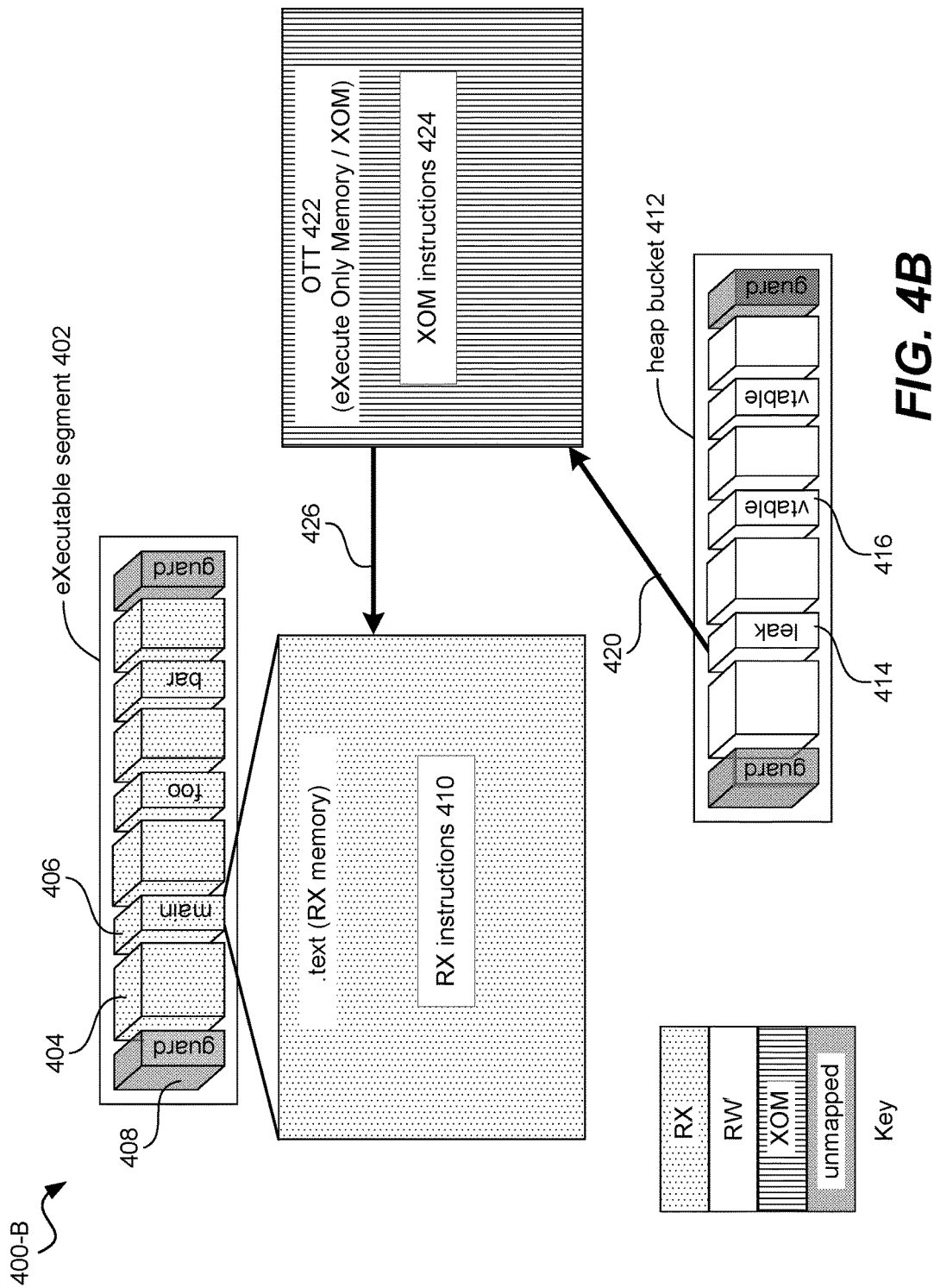
FIG. 4B illustrates an example memory design with implementing an OTT, according to certain embodiments of the present disclosure.

FIGS. 4A and 4B

FIG. 4A illustrates an example memory design 400-A without implementing an opaque trampoline table (OTT), according to certain embodiments of the present disclosure. Memory design 400-A includes executable segment 402. Executable segment 402 is written in readable and executable (RX) memory and contains functions, including function 404 and 406. In some embodiments, each function is a block of instructions. In some embodiments, executable segment 402 also includes guards 408 at the beginning and end of the executable segment, which are memory blocks that have not been allocated. In FIG. 4A, function block 406 is shown in expanded view to reveal RX instructions 410, which are readable and executable. Memory design 400-A also includes a heap bucket 412, which contains data that is written in readable and writeable (RW) memory. Heap bucket 412 contains vtables 416, which include reference pointers (or addresses) to different parts of memory. In some embodiments, heap bucket 412 also includes a "leak" 414 which is a vulnerability that an attacker may use to discover addresses to instructions in executable segment 402. In some embodiments, leak 414 is also a vtable. In some embodiments, heap bucket 412 also includes guards.

As demonstrated in FIG. 4A, an attacker can use leak 414 to discover a reference pointer 418 to any one of the RX instructions 410 in function 406 of executable segment 402. In some embodiments, any pointer that references any instruction in executable segment 402 can be used by the attacker and thus any data structure that contains the pointer, e.g. a heap bucket or a stack, contains the leak.

FIG. 4B illustrates an example memory design 400-B that implemented an OTT 422, according to certain embodiments of the present disclosure. Memory 400-B is analogous to memory design 400-A, except all pointers in RW memory, e.g. heap bucket 412, to executable segment 402 have been modified to point to OTT 422 instead. In FIG. 4B, this is represented with modified pointer 420. OTT 422 is XOM memory and thus cannot be read. OTT 422 contains XOM instructions 424, which in turn contain a pointer 426 to RX instructions 410. Since XOM instructions 424 are executable, legitimate function calls can still operate normally. However, attempts to read pointer 426 is prohibited because XOM instructions 424 cannot be read, thereby preventing the attacker from taking advantage of the leak 414.

Figure 5A:
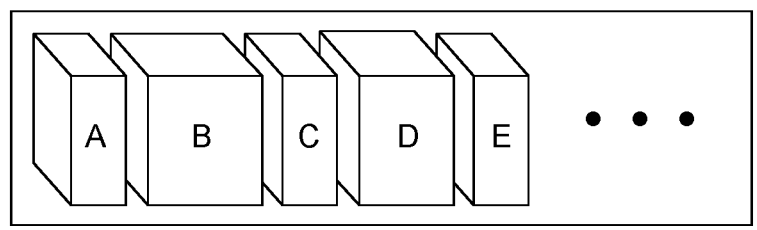
FIG. 5A illustrates an example of a stack datastructure storing instruction addresses for execution, according to certain embodiments of the present disclosure.
Figure 5B:
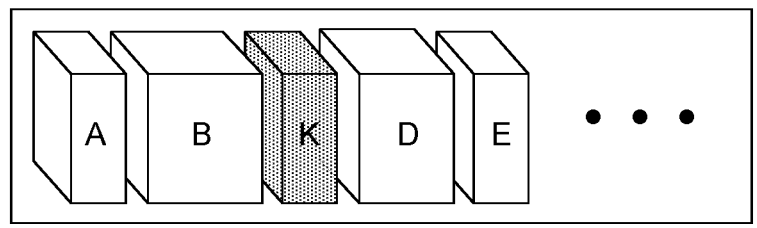
FIG. 5B illustrates an example of a stack datastructure storing instruction addresses for execution that has been manipulated by an attacker, according to certain embodiments of the present disclosure.

FIGS. 5A and 5B

FIG. 5A illustrates an example of a stack datastructure 500-A storing instruction addresses for execution, according to certain embodiments of the present disclosure. Stack 500-A includes addresses for instructions, e.g. instructions A, B, C, . . . FIG. 5B illustrates an example of a stack datastructure 500-B storing instruction addresses for execution that have been manipulated by an attacker, according to certain embodiments of the present disclosure. FIG. 5B illustrates a possible scenario in which an attacker has manipulated stack 500-A (thus forming stack 500-B), and replaced instruction address C with instruction address K. The scenario illustrated in FIG. 5B demonstrates why there is a need for systems to defend against exploitations. As shown in FIG. 5B, an attacker can manipulate stack data (instruction execution addresses) such that the system will execute whatever instruction the attacker puts into the stack. This allows attackers to bypass normal checks that prevent unauthorized execution of code (in this case, "K"). If a system implements the OTT 422 as shown in FIG. 4B, then the probability of the scenario in FIG. 5B occurring is greatly reduced.

The following descriptions provide more in-depth detail into example designs and systems in accordance with various embodiments of the present disclosure. However, the details provided are for example purposes only. In some embodiments, some of the details mentioned below may or may not be included in the overall system.

Threat Model

Vulnerability severity is often described in terms of the primitive that it offers attackers. Of memory corruption vulnerabilities, attackers cannot ask for more than an arbitrary, relative, RW (Read & Write) primitive over the entire target address space. If a mitigation is able to defend against such a powerful primitive, less powerful primitives (those that provide a subset of full address space RW) will be deterred as a matter of course.

In spite of its potency, the arbitrary RW primitive is far from uncommon in ubiquitous software packages. Software that presents the attacker with a Turing-complete exploitation environment (web browsers, JavaScript-enabled PDF viewers, Office documents, etc) provide numerous avenues for simple bugs to offer such a primitive.

Some vulnerability classes hand the primitive to the attacker, while others can be leveraged to construct the primitive. In the general case (absent specific vulnerability quirks), defenders should expect DEP, ASLR and all other mitigations to fail when confronted with such a powerful—and not uncommon—primitive. If it is reasonable to expect the failure of today's mitigations, the focus should be to look into new directions for tomorrow's mitigations.

In some embodiments, the system assumes the attacker is able to conduct arbitrary RW over the entire address space, but has not yet discovered an eXecutable page. The attacker must either guess such a location (brute force), or leak a reference to an eXecutable page. By using an opaque trampoline table (OTT), built on the XOM primitive, the latter strategy becomes infeasible. The former strategy is already infeasible in many RCE situations.

Design

In some embodiments, the OTT is a contiguous region of XOM memory, consisting of JMPs and CALLs. All references to eXecutable memory in data segments are redirected instead to OTT. In other words, any data (e.g. on the heap) that would normally contain references to eXecutable pages (e.g. an object's vtable), will be modified instead to point to the OTT.

In some embodiments, to achieve the goal of no references to eXecutable memory in readable memory, the system must rewrite most control flow transfers to bounce through the OTT. On x86-based systems, the modifications must deal with at least the following user space control flow transfer instructions:

1. jmp (& variants). jmp instructions are either relative or absolute, near or far, conditional or unconditional. Relative jmps are untouched, as they do not disclose absolute virtual addresses of eXecutable segments when read. Absolute addresses must be redirected to bounce through the OTT.
2. call (& variants). The call instruction is functionally equivalent to a (not possible) push eip, jmp <target> sequence. Some instructions, e.g. enter, implement this functionality and more. Such instructions are similarly handled. Call deserves special attention because it implicitly pushes an absolute eXecutable address to the stack prior to branching. There are several ways to protect this address from disclosure. When source code is available, Clang/LLVM's well-supported, low-overhead SafeStack feature is utilized. When source is not available, the binary will move the pushed address to a safe location and scrub it from the unsafe stack on each call.
3. ret (& variants). The ret instruction is functionally equivalent to a (not possible) pop eip instruction. Some instructions, e.g. leave, implement this functionality and more. These instructions are similarly handled.
4. loop (& variants). These more esoteric control flow transfer instructions boil down to the same semantics as jmp instructions are handled in the same manner.

In some embodiments, the OTT design is flexible enough to accommodate unexpected cases during implementation. Instructions that trap to kernel, e.g. sysenter, syscall and int behave as normal: they do not necessitate a bounce through the OTT.

Advantages

The systems and methods disclosed herein provide several advantages over currently available solutions. Current techniques fail to account for function identification attacks (described later). In addition, the system disclosed herein apply this solution to a wider range of CPUs than other techniques.

Advantage #1: Mitigating Whole-Function Gadget Chaining

By not protecting the virtual addresses of XOM OTT slots, other systems are incapable of deterring an attacker who seeks to exercise whole-function gadgets. Using decades-old exploitation techniques, attackers can leverage whole-function gadgets to defeat the security offered by other systems.

Unlike the systems disclosed herein, other systems are incapable of preventing abuse of this legitimate functionality. In addition, the virtual addresses of both code segments and the XOM OTT slots that point to them are protected from disclosure. The techniques of the present disclosure recognize that protecting the virtual addresses of the slots is essential to the security of the system.

The system places all code pointers in its XOM memory mapping, but leaves pointers to the XOM OTT in Readable memory. By keeping XOM OTT pointers in the system's Readable data memory, the system permits their disclosure.

An attacker leverages a vulnerability to achieve a relative, arbitrary, RW primitive on the heap. The attacker causes allocation of chosen Objects on the heap, adjacent to this relative read primitive.

The attacker uses his/her relative read vulnerability to disclose vtable entries in this adjacent Object. The system ensures that these vtable entries point to XOM OTT slots rather than directly at code backing the Object's methods.

By reading the vtable entries for the chosen Object, the attacker can correlate XOM OTT slot entries with known methods (remember: the attacker chose the Object and therefore knows what methods the Object implements). Example: If JavaScript object Foo implements a method called Bar, an attacker can correlate the appropriate XOM OTT slot for the JavaScript object method Bar. It turns out this correlation (knowing that XOM OTT slot X corresponds to chosen method Foo.Bar( )) is sufficient to evade other systems in virtually all cases.

The attacker is now capable of redirecting control flow to the beginning of the Bar( ) method, albeit with a transition through the XOM OTT—all without disclosing the actual address of Bar( ). Although other systems may prevent the attacker from transferring control to locations other than legitimate function entry points, other systems will not prevent the attacker from establishing correlations between XOM OTT slots and chosen methods, nor prevented the attacker from calling any such correlated method—or chaining such method calls together. Constraining execution transfers to legitimate function entry points provides some benefit, but is insufficient to deter decades-only exploitation strategies that simply need to chain legitimate, whole-function logic together.

The system presented here prevents this class of attack by hiding virtual addresses of both code segments and XOM OTT slots. In the following example describes the bare minimum to accomplish this protection, present an attack against the bare minimum and then enhance the protection to address the presented attack.

Preventing Whole-Function Chaining Attacks

If attackers are able to achieve their goals by chaining whole-function calls together (and they are), a system must prevent the attacker from establishing this ability. In addition to considering the contents of eXecutable code to be a secret, the system applies a transitive secrecy property to code pointers in the same manner as CPI: in an exemplary design, sensitive (secret) pointers are code pointers and pointers that may later be used to access sensitive pointers.

In other words, one example system may consider the following items to be a secret:
1) The contents of eXecutable code at runtime. This is probabilistically enforced by virtue of attackers' inability to read code pointers (#2, #3) and therefore disclose code segment locations. Attackers are relegated to brute forcing code locations.
2) The contents of code pointers. This is deterministically enforced by virtue of storing all code pointers in XOM memory.
3) The contents of pointers that may later be used to access sensitive pointers, e.g. the XOM OTT slots. This is probabilistically enforced by breaking slot addresses into offsets and a base address, encoded in the eXecutable code itself. Attackers are able to disclose the offset (stored in RW data memory), but cannot disclosure the base address because they cannot Read the eXecutable code in the first place (#1).

In some embodiments, this is only necessary for protecting indirect control transfers. In such embodiments, it is not necessary for protecting direct control transfers (transfers that encode the slot address directly in eXecutable code). Direct control transfers are inherently protected by item #1 above. In the following listings, assume 0xdeadbeef is the address of an XOM OTT slot that legitimate code wishes to transition through.

(Listing 1) A direct control flow transfer in x86 assembly:
  mov eax, 0xdeadbeef
  jmp eax The instructions in Listing 1 unconditionally transfer execution to the address 0xdeadbeef.

(Listing 2) An indirect control flow transfer (again, x86 assembly):
  jmp dword ptr [eax]

The instruction in Listing 2 transfers execution to 0xdeadbeef iff the memory referenced by eax holds the value 0xdeadbeef.

Listing 1 hard-codes the control flow destination (0xdeadbeef) into the instructions themselves, whereas Listing 2 consults memory pointed by eax for the destination. If the system assumes an attacker has RW access to data memory and eax points to a data location, then the attacker may be able to cause execution to transfer to a chosen location in Listing 2 but not in Listing 1. Altering the destination in Listing 1 would demand: (1) knowing where this code resided, (2) Write permission to this code page. In various embodiments, the system prevents both of these things from occurring. (1) cannot happen because attackers cannot leak code pointers; (2) cannot happen due to standard page permissions on eXecutable pages (RX) that prohibit Writes.

If an attacker is able to correlate chosen functions with the XOM OTT slot locations that reference them in a manner described above, the attacker can cause control flow to transfer to these known functions by changing memory referenced by instructions such as the one in Listing 2.

In some embodiments, a naive solution to this problem is to partition XOM OTT slot addresses so that part of the address is protected from disclosure. In other words, part of the address is considered a secret.

(Listing 3) An indirect control flow transfer with an inlined base address:
  add [eax], 0xdead0000; the XOM OTT base address . . .
  jmp dword ptr [eax]; added to the offset stored @ [eax]

Due to the add instruction, Listing 3 will transfer execution to 0xdeadbeef iff the memory referenced by eax holds the value 0x0000beef. As before, the system assumes attacker ability to RW arbitrary data memory, so the system assumes the attacker is able to disclose the 0x0000beef value referenced by eax. By encoding the most significant bytes of 0xdeadbeef directly into an add instruction, however, the attacker would not be privy to the 0xdead0000 portion of the sum address.

Absent the ability to disclose complete addresses for XOM OTT slots, attackers cannot abuse instruction sequences such as the one in Listing 2 to redirect control flow to whole-function gadgets to achieve their purpose.

Per-Call-Site "Keys"

In some embodiments, the above turns out to be insufficient protection. Consider an attacker that disclosed the 0x0000beef portion of the address (the offset) of the XOM OTT slot for a correlated function Bar( ). Although the attacker has insufficient information to abuse Listing 2, the attacker does have sufficient information to abuse Listing 3. If all indirect control transfer instruction sequences contain the same hidden value, then any such sequence (exemplar in Listing 3) can be abused with knowledge of only the offset of the XOM OTT slot. This adds a layer of indirection to the problem, but doesn't solve it.

In various embodiments, one solution is to have each indirect control flow transfer sequence to encode a unique secret. In some embodiments, this call-site-specific secret is referred to as a key. By having a unique key per call site, leakage of an XOM OTT offset used in one call site sequence becomes invalid (and therefore useless) for any other.

(Listing 4) An indirect control flow transfer with an inlined base address and secret:
; [eax] stores the "offset" of the XOM OTT slot
xor [eax], 0xAAAAAAAA; the "key"
add [eax], 0xdead0000; the "base" of the XOM OTT slot
jmp dword ptr [eax]

Due to the xor and the add instructions, Listing 4 will transfer execution to 0xdeadbeef iff eax references 0xAAAA1445.

(Listing 5) An indirect control flow transfer with an inlined base address and a different secret:
; [eax] stores the "offset" of the XOM OTT slot
xor [eax], 0xBBBBBBBB; the "key"
add [eax], 0xdead0000; the "base" of the XOM OTT slot
jmp dword ptr [eax]

Due to the xor and the add instructions, Listing 5 will transfer execution to 0xdeadbeef iff eax references 0xBBBB0554.

In order to transfer control to 0xdeadbeef, Listing 4 and 5 demand that eax reference different values. Leakage of one value does not permit an attacker to successfully redirect control flow in the other. Without leakage of the key for the target call site, this cannot be directly surmounted by an attacker.

Perhaps less obviously, the most significant bytes of the XOM OTT (the base portion of the address) should still be added inline. If they are not added inline, an attacker can leak two offsets for the same call site, xor them together and discover the base address. Knowledge of the base address reduces the entropy of the call site keys by half in the examples above.

In some embodiments, injecting such keys inline does not completely deter exploitation. Theoretically, an attacker may be able to meaningfully change control flow by replacing a call site's offset with another offset that is valid for that call site. Although possible, the likelihood of such an opportunity is low and the utility such a replacement is expected to be lower.

Regardless, inline secret encoding substantially increases attacker cost. Compared to the most closely related prior art, the methods and techniques presented here substantially raises the bar, outright preventing meaningful exploitation via whole-function chaining in the common case.

Advantage #2: Applicability to all of the The Most Popular Modern Architectures

Below, various ways to achieve XOM memory protections on today's commodity CPU architectures (x86, x86_64, ARM) are described. Notably, other systems employ only a single XOM technique, limiting applicability to x86_64 CPUs with virtualization extensions (VT-x) available and limited to machines that permit the introduction of hypervisor code.

XOM via Segment Register Permissions

On x86(_64) PAE, Protected Mode (32 bit only), segment registers can be used to define memory protections on regions of memory. The CPU will bitwise AND the page-level and segment-level permissions and act on the composite permission. It is possible to effectively implement XOM protections via these composites, enabling large memory regions to be XOM. The biggest drawback to this approach is the fact that it is not applicable to Long Mode (64 bit mode).

XOM via Second Level Address Translation (SLAT)

Intel and AMD introduced another layer of memory indirection as part virtualization extensions (VT-x for Intel, RVI for AMD). The intention of this additional layer was to enable faster memory accesses on machines that employ a hypervisor and multiple guest operating systems. As a side effect, this additional translation enabled the XOM permission on physical pages. Other systems used this side effect to implement their solution on x86_64 CPUs. The biggest drawbacks to this approach are: (1) it requires virtualization extensions, (2) it demands the ability to insert code into the hypervisor. #2 cannot be assumed in many cloud environments, limiting applicability.

XOM via Hardware Breakpoints x86 CPUs support the notion of both software and hardware breakpoints. Software breakpoints are implemented as special CPU instructions, inserted by the debugger at the chosen location. More specifically, they are simply an interrupt instruction with a special "breakpoint" meaning.

Hardware breakpoints are different: they are written into CPU-internal registers dedicated to breakpoints. By being built into the CPU itself, hardware breakpoints are more efficient and eliminate the need to modify debugged code in memory. However, although an unlimited number of software breakpoints as possible, the x86 architecture is limited to a total of 4 hardware breakpoints at any one time.

x86 supports the notion of a conditioned hardware breakpoint. The internal registers store not only the virtual address of the breakpoint, but the type of access necessary to trigger the breakpoint condition. Specifically, x86 (and other architecture) hardware breakpoints can be configured to trigger on any combination of Read, Write and eXecute accesses. By enabling the breakpoint on Reads and Writes but not eXecute, XOM can be effectively achieved via hardware breakpoints.

This carries a number of benefits, supporting all flavors of x86 hardware and modes and does not require virtualization extensions. Unfortunately, it comes at a cost: XOM protections can only be applied to the memory that can be described by these hardware breakpoints. On x86_64 Long Mode, this is 4*8=32 bytes of memory. Fortunately, this is sufficient space to implement the first level of a multi-level XOM OTT table at modest additional overhead (a single additional instruction transfer per OTT entry).

XOM via Translation Lookaside Buffer (TLB) Incoherency

Modern, ubiquitous CPU architectures employ a split TLB. Half of the TLB is dedicated to instruction fetches and half to data fetches. The motivation behind this design, even on Von Neumann architectures is performance: certain hardware-level optimizations can be achieved when data and instruction fetches are considered independently.

The TLB is a cache of instructions and data, providing low-latency retrieval for recently or frequently-accessed memory. As memory is fetched by the CPU, it is placed in the TLB. Subsequent accesses will terminate at the TLB until such time that the memory has been evicted from the TLB. Accesses that terminate at the TLB are far faster. Accesses for which an entry in the TLB does not exist (and therefore must result in a memory access) result in a cache miss, an event that is visible to the kernel's memory manager.

The split architecture of modern TLBs provides XOM opportunity: if the instruction TLB contains an entry corresponding to the XOM memory but the data TLB does not, a cache miss event will occur on data (Read, Write) fetches and will not occur on instruction (eXecute) accesses. Because the kernel has the ability to selectively evict and flush the TLBs independently, the kernel can force this situation, keeping XOM memory in the instruction TLB but not in the data TLB. This is referred to as cache incoherency. By trapping on cache misses, the kernel can mediate and prevent Read & Write access to XOM memory, disallowing the fetches.

TLB cache incoherency was utilized by PaX Team's original PAGEEXEC memory protection mechanism on the x86 family. The PaX team used TLB incoherency for a related but distinct purpose: by keeping memory in the data cache but not the instruction cache, PAGEEXEC enabled NX memory prior to explicit support with x86 PAE. More closely related work, HideM utilized cache incoherency to achieve an XOM primitive.

This incoherency can be achieved on ARM architectures by (ab)using the User/Supervisor bit on cache entries. On ARM architectures, it should be possible to mark XOM data cache entries as Supervisor and instruction cache entries as User. In doing so, the kernel (EL1) ensures that data (Read, Write) accesses to XOM memory by userspace (EL0) code will cause a trap to the kernel, whereas an instruction fetch (eXecute) will not cause a fault, thereby enabling XOM protections.

XOM via Native Support

In some embodiments, dedicated hardware support for the XOM primitive is ideal over unintended use of esoteric CPU features. Today's most popular architectures (x86 & ARM families) require this unintended use. These popular architectures may take a cue from less popular architectures that do offer native support (e.g. SPARC) in future designs. Such adoption could be accelerated by a compelling prototype demonstrating the security benefit of the XOM primitive.

It should be noted that ARMv8 does support XOM permissions in a documented manner. However, these permissions can only be applied to userspace (EL0) memory pages. In order to ensure the integrity of the XOM protection on ARMv8, kernelspace (EL1) must manually check memory access to make sure it does not inadvertently perform a Read or a Write of an XOM page on userspace's behalf (e.g. via write( )or read( ) syscalls on Linux). In other words, although ARMv8 supports XOM in theory, in practice, XOM cannot be used as the basis for a security property without significant kernel involvement (which is error-prone) and associated performance impact.

Advantage #3: No Compile-Time XOM OTT Randomization

Other systems' prototype implementations present a severe weakness: the slots in their XOM OTT are randomized only at compile time. Their security relies in part on the secrecy of this table. By randomizing at install time, other systems are unable to protect this secrecy for any application with wide distribution/availability: attackers can obtain the same binaries—with the same XOM OTT permutations—that will reside on victim machines.

This choice is informed in part by other systems' use of compiler plugins that generate their XOM OTT. In contrast, in some embodiments, the systems described here will randomize the XOM OTT at either install or load time. Options and rationale is presented below:

At compile time: this is what other systems do. This method is insecure for any application that an attacker has access to.

At install time: least performance impact, no load or runtime cost, minimal security benefit. An attacker that is able to disclose an install-time randomized XOM OTT once can exploit the protected application throughout its lifecycle on that target.

At load time: a balance between security and performance. For modest load-time cost, the operating system loader will randomize the XOM OTT slots and resolve relocations as normal, pointing to the correct slots. This sort of randomization is akin to the cost/benefit analysis one could apply to ASLR.

At run time: a modest increase in security for more substantial performance impact. The techniques presented herein will not take this route as the security benefit of re-randomization at runtime is negligible.

In some embodiments, first-class, dedicated support for full 3-bit R/W/X controls would enable XOM without hacking around current CPU limitations. The unintended use of CPU features described above become unnecessary and their overhead reduced.

In various embodiments, the system described here targets ASLR defeats. In some embodiments, any technique that prevents exploitation before an ASLR defeat becomes necessary would serve as a suitable alternative. Existing work in this space is either (1) prohibitively expensive in terms of computational overhead, (2) cannot prevent all attacks, (3) cannot be applied to all programs (e.g. those that employ a JIT engine), and/or (4) require extensive compiler instrumentation, source code access or architectural designs made specifically to take advantage of these alternatives.

In summary, the systems and methods disclosed provide significant benefits and advantages. For example, software developers who employ the techniques presented above will be able to better protect their users. Another example is improved security relative to competitor offerings will enable developers to benefit via improved market share/penetration.

In various embodiments, unlike some alternatives, the systems described are performant, and is in-line with accepted overheads for similar memory protection mechanisms while providing superior security advantage.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A system for probabilistic defense against remote exploitation of memory, comprising:
   one or more processors;
   memory having an address space, wherein the memory includes:
      read and execute (RX) portions of memory;
      read and write (RW) portions of memory; and
      execute only (XOM) portions of memory; and one or more programs stored in the memory, the one or more programs comprising instructions for:
- maintaining all pointers to RX memory instructions in slots in an opaque trampoline table in XOM memory (XOM OTT slots);
- preventing all direct references to RX memory in RW memory by forcing pointers in RW memory to reference XOM memory first, which then references RX memory instructions;
- injecting a call-site-specific key into each indirect control flow transfer sequence such that disclosure of one XOM OTT offset used in a first call site is invalid for a second call site; and
- hiding virtual addresses of both code segments and XOM OTT slots in order to prevent an attacker from establishing correlations between XOM OTT slots and chosen methods.

2. The system of claim 1, wherein the OTT is a contiguous region of XOM memory.

3. The system of claim 2, wherein the OTT comprises JMPs and CALLs.

4. The system of claim 1, wherein ASLR is implemented on the system.

5. The system of claim 1, wherein if an attacker can leak a pointer to a code segment, the attacker is still forced to guess because the attacker cannot find out through the leak where code segments exist in target address space.

6. The system of claim 1, wherein an attacker is able to conduct arbitrary read and writes over the entire address space of the memory.

7. A method for probabilistic defense against remote exploitation of memory on a computer system, the memory having an address space, comprising:
- maintaining all pointers to RX memory instructions in XOM memory;
- preventing all direct references to RX memory in RW memory by forcing pointers in RW memory to reference XOM memory first, which then references RX memory instructions;
- injecting a call-site-specific key into each indirect control flow transfer sequence such that disclosure of one XOM OTT offset used in a first call site is invalid for a second call site; and
- hiding virtual addresses of both code segments and XOM OTT slots in order to prevent an attacker from establishing correlations between XOM OTT slots and chosen methods.

8. The method of claim 7, wherein the OTT is a contiguous region of XOM memory.

9. The method of claim 8, wherein the OTT comprises JMPs and CALLs.

10. The method of claim 7, wherein ASLR is implemented on the system.

11. The method of claim 7, wherein if an attacker can leak a pointer to a code segment, the attacker is still forced to guess because the attacker cannot find out through the leak where code segments exist in target address space.

12. The method of claim 7, wherein an attacker is able to conduct arbitrary read and writes over the entire address space of the memory.

13. A non-transitory computer readable medium storing one or more programs configured for execution by a computer, the one or more programs comprising instructions for executing a method for probabilistic defense against remote exploitation of memory wherein the method comprises:
- maintaining all pointers to RX memory instructions in XOM memory;
- preventing all direct references to RX memory in RW memory by forcing pointers in RW memory to reference XOM memory first, which then references RX memory instructions;
- injecting a call-site-specific key into each indirect control flow transfer sequence such that disclosure of one XOM OTT offset used in a first call site is invalid for a second call site; and
- hiding virtual addresses of both code segments and XOM OTT slots in order to prevent an attacker from establishing correlations between XOM OTT slots and chosen methods.

14. The non-transitory computer readable medium of claim 13, wherein all pointers to RX memory instructions in XOM memory are maintained in an opaque trampoline table (OTT).

15. The non-transitory computer readable medium of claim 14, wherein the OTT is a contiguous region of XOM memory.

16. The non-transitory computer readable medium of claim 15, wherein the OTT comprises JMPs and CALLs.

17. The non-transitory computer readable medium of claim 13, wherein ASLR is implemented on the system.

18. The non-transitory computer readable medium of claim 13, wherein if an attacker can leak a pointer to a code segment, the attacker is still forced to guess because the attacker cannot find out through the leak where code segments exist in target address space.

* * * * *